US 6,986,335 B2

(12) United States Patent
Sieber et al.

(10) Patent No.: US 6,986,335 B2
(45) Date of Patent: Jan. 17, 2006

(54) METHOD FOR OPERATING AN INTERNAL COMBUSTION ENGINE

(75) Inventors: Udo Sieber, Bietigheim (DE); Siegbert Wessels, Hildesheim (DE); Richard Deptner, Schwieberdingen (DE); Manfred Ackermann, Oppenweiler (DE); Andreas Bisanz, Alfeld (DE); Peter Ahner, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 262 days.

(21) Appl. No.: 10/416,696

(22) PCT Filed: Dec. 18, 2001

(86) PCT No.: PCT/DE01/04723

§ 371 (c)(1),
(2), (4) Date: May 12, 2003

(87) PCT Pub. No.: WO02/49868

PCT Pub. Date: Jun. 27, 2002

(65) Prior Publication Data

US 2004/0025835 A1  Feb. 12, 2004

(30) Foreign Application Priority Data

Dec. 21, 2000  (DE) ................. 100 63 751

(51) Int. Cl.
*B60K 6/04* (2006.01)
(52) U.S. Cl. .................... 123/320; 180/65.2
(58) Field of Classification Search ........ 123/320–322, 123/325; 477/4, 21, 203; 701/22; 303/152; 180/65.1–65.6
See application file for complete search history.

(56) References Cited

U.S. PATENT DOCUMENTS

| 5,788,597 | A  | * | 8/1998  | Boll et al. ................. 477/4 |
| 5,899,828 | A  | * | 5/1999  | Yamazaki et al. ........... 477/4 |
| 6,085,705 | A  |   | 7/2000  | Vorih |
| 6,293,237 | B1 |   | 9/2001  | Vorih |
| 6,369,531 | B1 | * | 4/2002  | Oshima et al. ............ 318/139 |
| 6,414,453 | B1 | * | 7/2002  | Tamagawa et al. ......... 318/139 |
| 6,510,824 | B2 |   | 1/2003  | Vorih et al. |
| 6,705,686 | B2 | * | 3/2004  | Hilbert ..................... 303/152 |
| 2002/0116099 | A1 | * | 8/2002 | Tabata et al. ............. 701/22 |

FOREIGN PATENT DOCUMENTS

DE  32 27 810 A1  1/1984

(Continued)

*Primary Examiner*—Henry C. Yuen
*Assistant Examiner*—Arnold Castro
(74) *Attorney, Agent, or Firm*—Michael J. Striker

(57) ABSTRACT

A method for operating an internal combustion engine (10) installed in a motor vehicle having controlled intake and exhaust valves and that is coupled in fixed fashion with an electrical machine (16) charging an electrical energy accumulator, in particular a battery (21), wherein, in order to enable the electrical machine to perform recuperation on overrun or during braking operation of the internal combustion engine (10), the drag power or braking power of the internal combustion engine is regulated via intervention in the valve actuation process so that a braking or deceleration behavior of the motor vehicle is obtained that is familiar to the driver of the motor vehicle, wherein the valve actuation process and a regulation of the generator and motor operation of the electrical machine (16) are carried out as a function of the state of charge, preferably of at least four levels of the state of charge, of the energy accumulator (21), and wherein the valve actuation process and the regulation of the electrical machine (16) are coupled with a braking management system of the motor vehicle.

18 Claims, 4 Drawing Sheets

FOREIGN PATENT DOCUMENTS

| | | |
|---|---|---|
| DE | 196 32 074 A1 | 2/1998 |
| DE | 199 53 856 A | 5/2000 |
| EP | 0 819 561 A | 1/1998 |
| EP | 0 904 971 A | 3/1999 |
| EP | 0 847 488 B1 | 11/1999 |
| EP | 1 186 753 A | 3/2002 |
| FR | 2 803 253 A | 7/2001 |
| WO | 99 47801 A | 9/1999 |

* cited by examiner

* - internal combustion engine
** - electrical machine

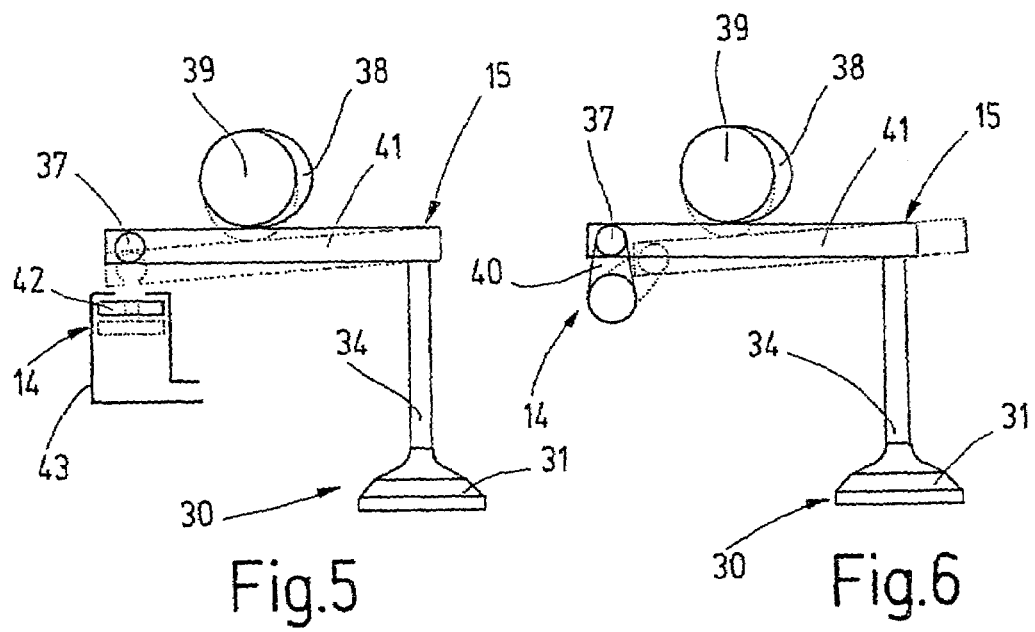
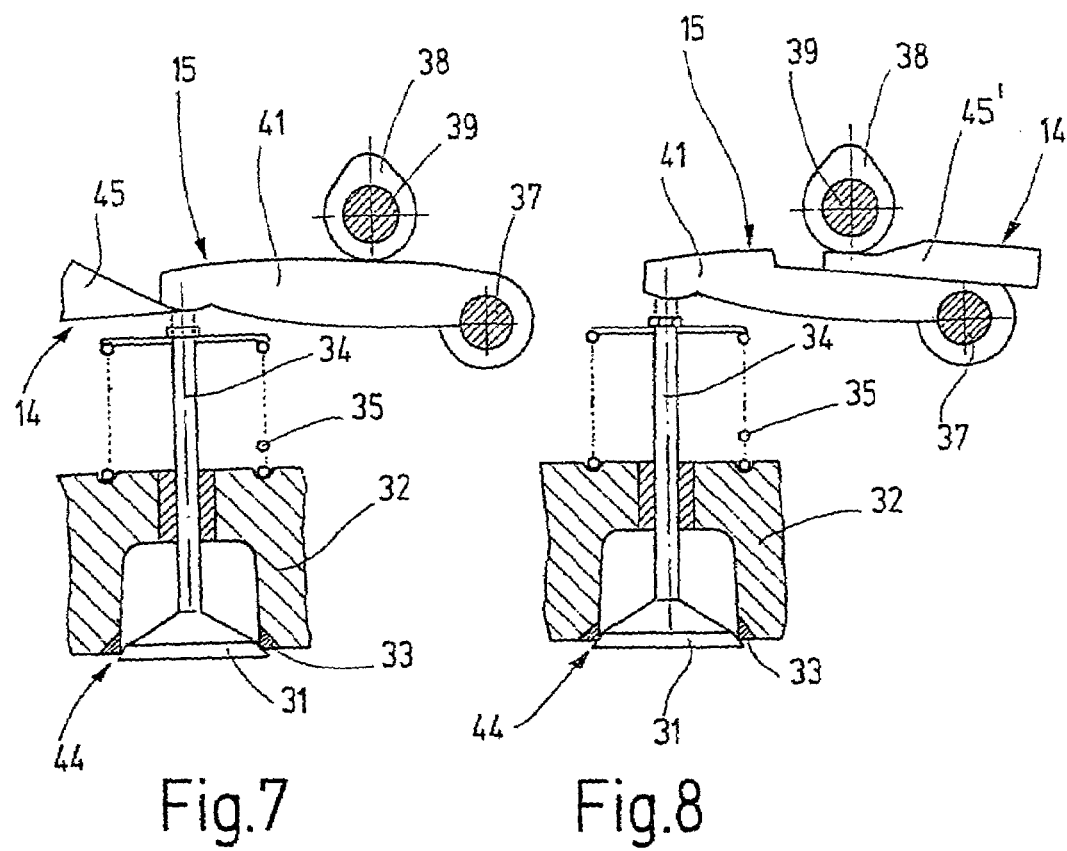

METHOD FOR OPERATING AN INTERNAL
COMBUSTION ENGINE

BACKGROUND OF THE INVENTION

The invention is based on a method for operating an internal combustion engine installed in a motor vehicle having controlled intake and exhaust valves.

In the case of a known method for operating a valve-controlled internal combustion engine (DE 196 32 074 A1), on the crankshaft of which an electrical machine serving as "starter-generator" is coupled without a clutch, the valves are displaced—before the internal combustion engine is started or accelerated—by a valve-control unit so that practically no compression is produced in the internal combustion engine. The starter-generator, in motor operation with relatively low power, can then rev the crankshaft of the internal combustion engine with little power while drawing current from the battery via a frequency converter, whereby the starter-generator only has to overcome the moment of inertia of the internal combustion engine and its friction. Rewing takes place while ignition, fuel injection, and mixture formation are switched off. The valves are displaced in a manner known per se by controlling valve lift directly in appropriate fashion, or by changing the timing angle between camshaft and crankshaft accordingly. When a minimum speed of the internal combustion engine detected by a speed sensor and sent to a main electronic control unit is reached, the valves are adjusted via the valve-control unit and the valve-actuator drive so that, after ignition of the internal combustion engine is switched on, the combustion process for operating purposes is started, whereby the inertial energy applied previously by the starter-generator operating in the motor mode helps to start and accelerate the internal combustion engine in short time. As soon as ignition has taken place in the internal combustion engine, the motor operating mode of the starter-generator switches off and changes over to generator mode, which allows the starter-generator to recharge the battery.

A method of this nature is used to shut down the internal combustion engine in operating phases of the internal combustion engine when no power output is required, or to allow some of the cylinders to simply run along without ignition and compression, and, when power is required once more, to initiate a restart of the internal combustion engine by delivering kinetic energy. This results in reduced fuel consumption and emission of pollutants.

In the case of a known drive system (EP 0 847 488 B1) that comprises an internal combustion engine and an electrical machine coupled to its crankshaft and serving to actively dampen rotational non-uniformities of the crankshaft of the internal combustion engine, both the internal combustion engine and the electrical machine are controlled by a microcomputer control unit. In the framework of controlling the internal combustion engine, the microcomputer control unit performs the following control tasks: fuel supply control, throttle valve actuation, fuel injection control, ignition control, valve actuation, charging-pressure regulation, exhaust gas recirculation control, and start/stop control. The rotational non-uniformities are dampened in this manner: the electrical machine generates a rapidly alternating torque, namely, a braking torque for a positive rotational non-uniformity and a driving torque for a negative rotational non-uniformity, onto which it superimposes a positive or negative torque, respectively, in order to additionally accomplish a driving action or a braking, regenerative action.

In the case of a drive system of this type that is also known (DE 32 27 810 C2) and that is used as a hybrid drive, an additional clutch is situated between the crankshaft of the internal combustion engine and the electrical machine that is operated as a generator, starter-generator and/or driving motor, in order to interrupt the engine braking action on the vehicle on overrun and thereby recuperate as much of the vehicle's kinetic energy as possible and return it to energy accumulator, e.g., the vehicle battery, to extend the coasting phase of the vehicle, or to operate exclusively on electric power under low-load operation.

SUMMARY OF THE INVENTION

The method according to the invention for operating a valve-controlled internal combustion engine of the motor vehicle has the advantage that, by intervening in the valve actuation, the braking action of the internal combustion engine on the vehicle can be continually reduced, thereby allowing greater drive power to be made available to the electrical machine operating in the generator mode, so that, during vehicle deceleration, a high level of recuperative operation is obtained, and as much energy as possible can be recuperated and stored in the energy accumulator. A similarly high level of recuperative operation is achieved with the known drive system described most recently hereinabove only by disengaging the additional clutch and, therefore, separating the internal combustion engine from the electrical machine, whereby the clutch requires increased manufacturing expenditure and is an additional component that is subject to wear. In contrast, this clutch can be eliminated entirely with the drive system according to the invention.

Since the deceleration or braking behavior of the vehicle caused only by the braking torque of the electrical machine differs substantially from that of a conventional internal combustion engine having common or "conventional" valve actuation, in the method according to the invention, the internal combustion engine still makes a contribution to the braking power, so that, when the driver of the vehicle "lets off the gas" or actuates the brakes, the predictable, familiar effect of an "engine brake" still takes place.

The regulation of the braking power of the internal combustion engine is preferably carried out as a function of the braking power produced by the electrical machine so that the sum of the braking power of the electrical machine and the internal combustion engine corresponds at any point during vehicle deceleration to the braking power produced by an internal combustion engine having conventional valve actuation. In this case, "conventional valve actuation" is understood to be the customary valve actuation process with opening and closing times and lifting of the intake and exhaust valves determined by a camshaft with control cams, including the influence on them, e.g., variable camshaft timing by rotation, selective camshaft-lobe actuation, and/or control cam lobes with a curved three-dimensional profile and the like.

Moreover, with the method according to the invention for intervening in the valve actuation process, different arrangements of the electrical machine relative to the crankshaft of the internal combustion engine can be realized. For example, the electrical machine need not be located between the internal combustion engine and driving clutch on the crankshaft, as required with starter-generators having a second clutch between the internal combustion engine and electrical machine. For instance, the electrical machine can be located on the crankshaft on the side of the internal combustion engine furthest from the driving clutch, or it can be removed from the drive train of the internal combustion engine and coupled to the crankshaft via a belt drive or a gearset.

According to a preferred exemplary embodiment of the invention, the intervention in the valve actuation process is carried out for the purpose of continually reducing the duration of opening and/or the lift of the valves up to the point of their closing. This continual control of the duration of opening and/or valve lift makes it possible to control the braking or drag power of the internal combustion engine easily and with great accuracy between the limit values "conventional valve actuation" and "valves completely closed" in the manner stated. The intervention can be carried out on the intake and exhaust valves, or, as an alternative, intervention in the valve actuation process can be carried out only on the intake valves in this manner. The attainable recuperation potential in this scenario is negligibly less than when intervention is carried out on all valves, but the control expenditure that it requires is substantially less. The cost-benefit ratio is therefore much more favorable when intervention is carried out on the intake valves only.

In an alternative exemplary embodiment of the invention, the intervention in the valve actuation process takes place for the purpose of achieving a target decompression of the internal combustion engine. The target decompression is brought about by controlling the duration of opening and/or the lift of the exhaust valves. Since the pressure level in the combustion cylinder and the friction associated therewith are greater, and they offset a portion of the recovered compression power, a somewhat lesser extent of recuperative operation is obtained.

According to an advantageous embodiment of the method according to the invention, the valve actuation process and a regulation of the generator and motor operation of the electrical machine are carried out as a function of the state of charge of the energy accumulator, in particular the battery, whereby preferably at least four levels of the state of charge are taken into consideration. If the energy accumulator becomes increasingly full, e.g., on extended overrun (driving downhill), and it can accept an increasingly lesser amount of the alternator current supplied by the electrical machine, intervention in the valve actuation process is carried so that it moves closer to the upper limit, i.e., "conventional valve actuation", i.e., the braking power of the internal combustion engine increases continually. If the energy accumulator is once again able to accept battery charge current, the braking torque of the internal combustion engine is reduced once more by continually actuating the valves in the direction toward the lower limit, i.e., "valves completely closed".

By providing at least four levels of the state of charge of the energy accumulator, in particular of the state of charge of the battery, an allocation of alternator current and battery charge current can be obtained that ensures that the state of charge deviates very little from a mean level, even when different loads are placed on the electrical system. This allows the energy accumulator to accumulate enough alternator current on overrun to generate a suitable level of regenerative braking torque to simulate the braking of the internal combustion engine.

According to a preferred exemplary embodiment of the invention, the valve actuation process and the regulation of the electrical machine are combined with a braking management system of the motor vehicle. With this, the service brake to be activated by the driver is used, and an available ABS or a traction control system (TCS) can be employed as well.

According to an advantageous exemplary embodiment of the invention, a braking management system of this nature is designed so that, on overrun, when brake pressure applied by actuation of the brake pedal increases continually, the braking action of the service brake does not set in until the electrical machine working in the generator mode and the internal combustion engine output their maximum levels of braking torque and, therefore, the necessary vehicle deceleration cannot be achieved.

BRIEF DESCRIPTION OF THE DRAWINGS

The invention is explained in greater detail in the description hereinbelow with reference to the exemplary embodiments shown in the drawing.

FIGS. 4 through 10 are schematic illustrations of a design embodiment of a valve adjusting drive with valve actuation according to seven different exemplary embodiments.

DESCRIPTION OF THE PREFERRED EMBODIMENTS

Figure 1:
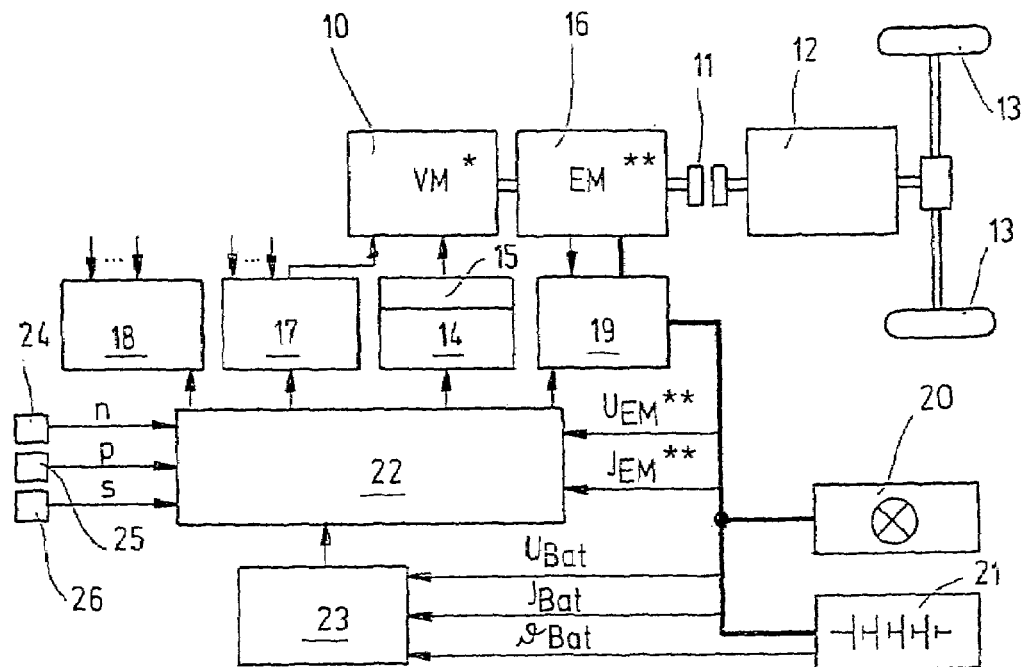
FIGS. 1 and 2 are block diagrams of a system for operating a valve-controlled internal combustion engine of a motor vehicle according to a first and second exemplary embodiment.

In the block diagram in FIG. 1, a valve-controlled internal combustion engine 10 drives the drive wheels 13 of a motor vehicle via a driving clutch 11 and a transmission 12. The known intake and exhaust valves of the cylinders (not shown here) of the internal combustion engine 10 are controlled by a valve-control unit 14 by means of a valve-actuator drive 15 that actuates the valves. As shown in FIGS. 4–10 but not in FIG. 1, the valve-actuator drive 15 comprises, in known fashion, a camshaft with control cams that act on cam followers, rocker arms or overhead bucket-tappet assemblies, for example, that, in turn, act on tappets to open and close the associated valve, whereby the opening and closing times are determined by the valve-control unit 14 and can be changed, e.g., by changing the timing angle between the crankshaft and the camshaft that it drives. The internal combustion engine 10 is coupled in fixed fashion with an electrical machine 16; in fact, the rotor shaft of the electrical machine 16 is interconnected in torsion-resistant fashion with the crankshaft of the internal combustion engine 10, or the rotor of the electrical machine 16 is mounted on the crankshaft in torsion-resistant fashion.

The system for operating the valve-controlled internal combustion engine 10 comprises, in addition to the valve-control unit 14 with valve-actuator drive 15, an electronic control unit 17 for the engine management system that controls the fuel supply and mixture formation and/or the injection and ignition in the individual cylinders of the internal combustion engine 10. Said system also comprises an electronic control unit 18 for the service brake, and a controlling system 19 for the electrical machine 16. By means of the controlling system 19, the alternator current produced by the electrical machine 16 at the moment is allocated to a supply current for consumers 20 and a battery charge current for an electrical battery 21 that is an example of a general electrical energy accumulator.

A main electronic control unit 22 accesses the individual electronic control units 14, 17 and 18 and the controlling system 19 and generates control signals that are implemented in the individual control units. A battery monitoring system 23 monitors the battery current $I_{Bat}$, battery voltage $U_{Bat}$ and battery temperature $\vartheta_{Bat}$ of the battery 21 and determines the state of charge of the battery 21. It then forwards this finding to the main electronic control unit 22. Additional influencing variables that are forwarded to the main electronic control device 22 are the alternator current $I_{EM}$ and the alternator voltage $U_{EM}$. Additional influencing variables that are forwarded to the electrical machine 16 are the speed n of the internal combustion engine 10, the brake pressure p produced by the driver using the brake pedal, and the accelerator-pedal travel s of the accelerator pedal to be actuated by the driver. The latter three influencing variables are detected by sensors 24, 25 and 26 and sent to the main electronic control unit 22 as electrical signals.

In order to recover the kinetic energy of the vehicle (recuperation) during braking operation and on overrun of the internal combustion engine from the point when the driver "lets off the gas" up to the point when the driver actuates the service brake, the main electronic control unit 22 intervenes in the conventional valve actuation of the intake and exhaust valves in this operating phase by means of the valve-control unit 14 and the individual valve-actuator drives 15 in such a manner that the duration of opening and/or the lift of the valves are continually reduced to the point at which the valves are completely closed. As a result, the braking torque produced by the internal combustion engine on overrun decreases continually and reaches a minimum when the valves are held completely closed. The kinetic energy of the vehicle is now used to drive the electrical machine 16, which produces a corresponding alternator current to charge the battery 21. At the same time, the main electronic control unit 22 acts on the controlling system 19 of the electrical machine 16 to control the alternator current of the electrical machine 16 so that the regenerative braking torque produced by the electrical machine 16 corresponds to the familiar vehicle deceleration by the internal combustion engine having conventional valve actuation, i.e., without recuperation.

The extent to which this simulation is completely achieved depends on the state of charge of the battery in the braking phase, i.e., on whether or not the battery can accept all or just a portion of the alternator current produced by the electrical machine 16. A distinction is made here between two cases, which are explained with reference to the diagrams in FIG. 3:

In Case 1, the size of the electrical machine 16 is sufficient to produce the desired vehicle deceleration, and the battery 21 has enough charging capacity available to accept the alternator current produced by this vehicle deceleration.

In Subcase 1.1, the brake pedal is not actuated, and the accelerator pedal is not actuated or it is only slightly actuated. The main electronic control unit 22 intervenes in the valve actuation process so that the intake and exhaust valves are closed. The main electronic control unit 22 controls the alternator current of the electrical machine 16 as a function of the engine speed n, the brake pressure p and the accelerator-pedal travel s so that the regenerative braking torque produced by the electrical machine 16 brings about the familiar deceleration of the vehicle. When the accelerator pedal is not actuated, the alternator output power produced by the electrical machine 16 is nearly constant and the alternator current continually charges the battery 21, as illustrated in the uppermost diagram in FIG. 3. If the accelerator pedal is actuated slightly, the alternator output power is reduced, and the charge current for the battery 21 reduces accordingly.

In Subcase 1.2, the brake pedal is actuated slightly, so that—as illustrated in the diagram of "brake pressure over time"—the brake pressure increases slowly. The control of alternator current initiated by the main electronic control unit 22 via the controlling system 19 (the diagram of "alternator output power over time") starts with the current to simulate the vehicle deceleration when brake pressure is nil, and it increases the current continually until the desired vehicle deceleration is reached.

In order to realize this case—in which the battery 21 is capable of accepting all recuperative energy—as often as possible, the regulation of the generator operation (and, if necessary, the motor operation) of the electrical machine 16, and the valve actuation process are carried out depending on the state of charge of the battery 21. Four levels of the state of charge of the battery 21 are specified in the exemplary embodiment. They are a first and second lower limit, and a first and second upper limit, as illustrated in the top diagram in FIG. 3. The state of charge of the battery 21 is detected by the battery monitoring system 23, which measures the battery voltage $U_{Bat}$, the battery current $I_{Bat}$, and the battery temperature $\vartheta_{Bat}$ for this purpose. If the state of charge exceeds or falls below the individual levels, the battery monitoring system 23 notifies the main electronic control unit 22 of this fact, and said main electronic control unit triggers the appropriate control processes in the controlling system 19. The electrical machine 16 is controlled so that the state of charge of the battery deviates from a mean level only slightly even when different loads are placed on the electrical system, i.e., when different levels of current are drawn by the consumers 20.

Figure 3:
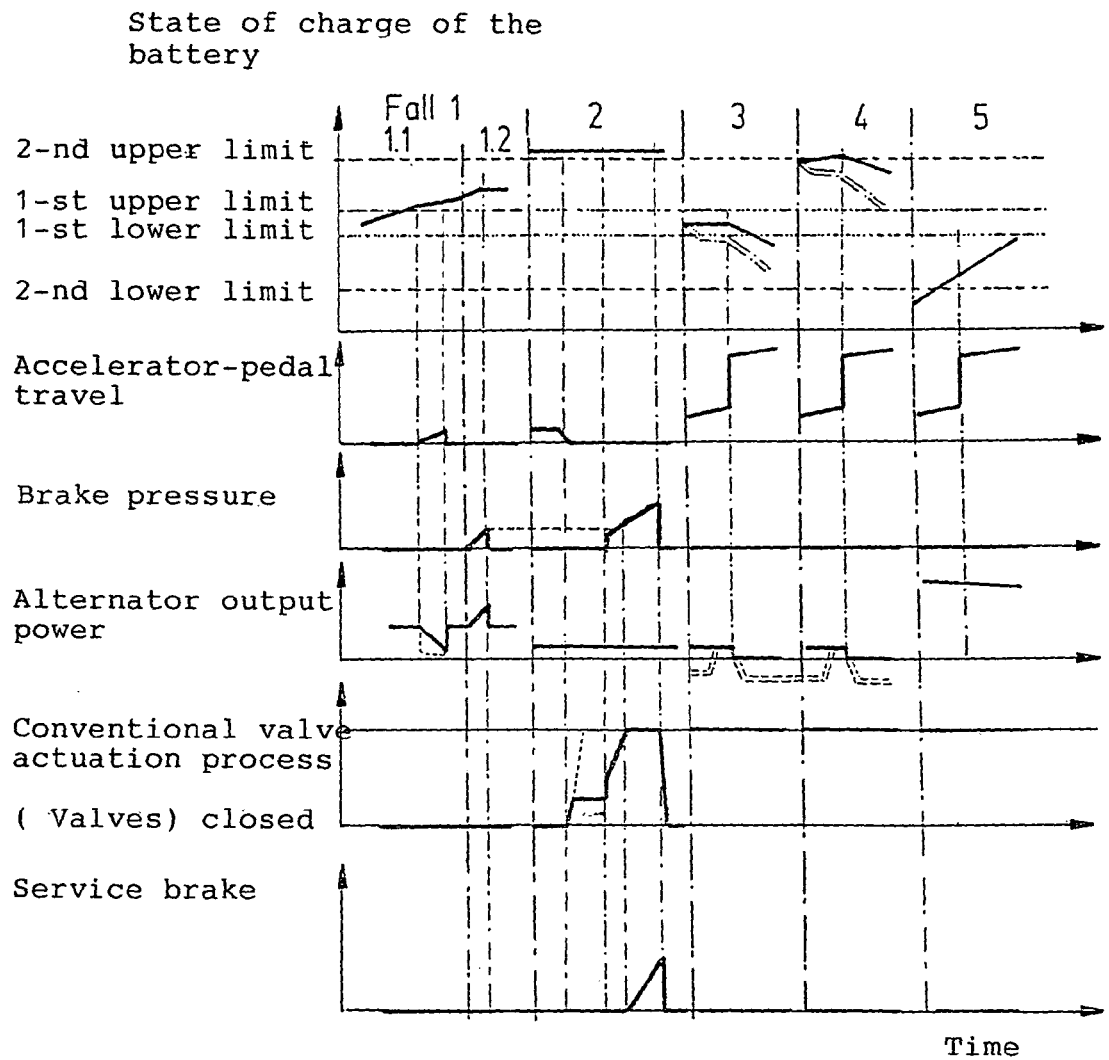
FIG. 3 shows various time diagrams to explain the valve actuation process and regulation of the electrical machine corresponding to the state of charge of the battery, accelerator-pedal travel and brake pressure, as well as the coupling with a service brake.

Cases 3, 4 and 5—each of which involves a driving state outside of the recuperation phases—are shown as examples in FIG. 3 for purposes of illustration. As shown in the two bottom diagrams in FIG. 3, the service brake is not actuated, and the valve actuation process is conventional, i.e., the main electronic control unit 22 does not influence the valve-control unit 14. In Case 3, the state of charge of the battery 21 is between the first lower limit and the first upper limit. The alternator current is regulated so that just enough is produced to supply the consumer 20. If the internal combustion engine 10 is brought to wide-open throttle by "flooring it" (second diagram from the top in FIG. 3), the alternator current is temporarily reduced (fourth diagram from the top in FIG. 3). The battery 21 supplies battery current to the vehicle electrical system (equipment 20), and the state of charge of the battery 21 drops. The reduction in alternator current is limited either by the battery state of charge approaching its second lower limit, or by a predetermined time limit.

In Case 4, the battery 21 is fully charged, and the alternator current is regulated so that the requirements of the vehicle electrical system are just met. If the state of charge of the battery 21 exceeds the second upper limit, the alternator current is reduced, and the vehicle electrical system is supplied entirely by the battery 21. After the battery state of charge falls below the second lower limit (Case 5), the alternator is regulated to produce maximum alternator current until the battery state of charge approaches the first lower limit, so that Case 3 as described hereinabove prevails once more.

If the electrical machine 16 permits motor operation, then—as illustrated in cases 3 and 4 using dash—dotted lines-motor operation occurs temporarily in wide-open throttle phases, and it lasts longer in other operating ranges, if efficiency can be increased in this manner. If the battery state of charge falls below the second lower limit (Case 5 in FIG. 3), motor operation is halted. The switching-on of the generator operation or the switching-off of the motor operation takes place continually along a predetermined time line, whereby time constants of a conventional internal combustion engine are simulated.

In Case 2 shown in FIG. 3, the battery 21 has reached a state of charge in which it can not accept any or only a portion of the alternator current offered during recuperation. In this case, the alternator current produced by the electrical machine 16 is regulated so that the electrical machine 16 generates a level of regenerative braking torque that permits simulation of a portion of the vehicle deceleration occurring on overrun with conventional valve actuation. The remaining portion of the vehicle deceleration is generated by the internal combustion engine 10 by means of an adapted intervention in the valve actuation process depending on the accelerator-pedal travel that occurs. As the alternator current decreases, the valves are controlled so that the braking torque produced by the internal combustion engine increases accordingly, and, as the alternator current increases, the valves are controlled in such a manner that the braking torque produced by the internal combustion engine decreases accordingly. In Case 2, the accelerator pedal is actuated slightly at first and the brake pedal is not actuated. The valves are closed completely in order to utilize the recuperative operation. The slight vehicle deceleration required at the moment is simulated entirely by the electrical machine 16. If the accelerator pedal returns to its non-actuated position, the vehicle deceleration must be increased. The electrical machine 16 cannot produce a greater level of regenerative torque, however, since the battery can not accept any more battery charge current. By the continual adjustment of the timing and/or valve lift of the intake and exhaust valves triggered by the main electronic control unit 22, additional engine braking torque of the internal combustion engine 10 is produced that, together with the regenerative braking torque produced by the electrical machine 16, brings about the desired vehicle deceleration. If the driver actuates the brake to decelerate the vehicle more quickly, the brake pressure rises continually (refer to the "brake pressure over time" diagram in FIG. 3). Based on the increase in brake pressure detected by the sensor 25 and forwarded to the main electronic control unit 22, the timing and/or timing and lift of the intake and exhaust valves are adjusted continually in this manner until the internal combustion engine produces its maximum braking torque with conventional valve actuation. The increase in brake pressure then brings about a delayed activation of the braking action of the service brake if the necessary vehicle deceleration cannot be achieved by the maximum regenerative braking torque of the electrical machine 16 and the maximum braking torque of the internal combustion engine 10. The increase in the braking action of the service brake is illustrated in the diagram at the bottom in FIG. 3. By coupling the valve actuation process and regulation of the electrical machine 16 with the braking management system in this manner, the necessary vehicle deceleration is achieved with maximum possible recuperation and a familiar vehicle deceleration.

The regulation process described hereinabove for Case 2 also applies in similar fashion if the size of the electrical machine 16 is not adequate to fully simulate the desired vehicle deceleration using regenerative braking torque. In this case as well, the remaining portion of braking torque required is generated by intervening in the valve actuation process of the internal combustion engine 10 and the target adjustment of the engine braking torque associated therewith.

In all the processes for regulating the electrical machine 16 and the valve actuation process of the internal combustion engine 10 described hereinabove, hystereses are specified that are selected depending on values of the state of charge of the battery 21, or depending on time. Additionally, time constants like those that occur with conventional valve actuation are simulated by regulating the electrical machine 16 and by the valve actuation of the internal combustion engine 10.

Figure 2:
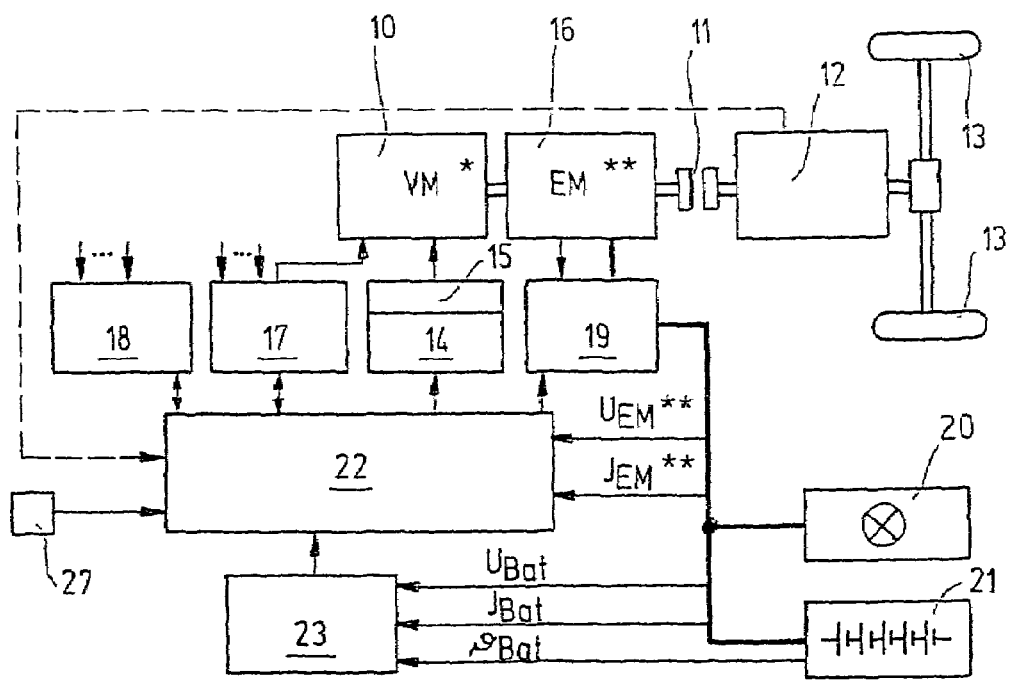

The modified system for operating the internal combustion engine 10 shown as a block diagram in FIG. 2 differs from the exemplary embodiment described with reference to FIG. 1 by the fact that at least one engine-management signal is forwarded by the electronic control unit 17 to the main electronic control unit 22, e.g., the speed signal or a signal for overrun fuel cutoff, i.e., to shut off fuel supply on overrun, which said signal is used by the main electronic control unit 22 as an alternative to accelerator-pedal travel to control the valve-control unit 14 and controlling system 19. Signals from the controlling system 19, e.g., the speed signal, can be processed in the main electronic control unit 22 as well. Additionally, the electronic control unit 18 for the service brake forwards brake-control signals to the main electronic control unit 22. Furthermore, the signal from a brake-light switch 27 that is output when the service brake is actuated can be forwarded to the main electronic control unit 22. The mode of action of the intervention in the valve actuation of the internal combustion engine 10 and the regulation of the electrical machine 16 described hereinabove is the same, with the exception that, instead of accelerator-pedal travel, control signals from the engine management system are used and, when the brake pressure sensor 25 is eliminated, the signals from the electronic control unit 18 for the service brake are utilized. If the signal from the brake-light switch 27 is used as an alternative to take the brake pressure into consideration, full engine braking torque is applied when the brake pedal is actuated, instead of the engine braking torque being continually increased. The comfort for the driver associated with this alternative can be increased if, by adding gear position detection, the valve actuation process and regulation of the electrical machine 16 are modified by the main electronic control unit 22 so that recuperation can be eliminated in the lower gears. A gear position detection signal derived from the transmission 12 is then forwarded to the main electronic control unit 22 via the signal line indicated in FIG. 2 as a dashed line.

As described hereinabove, the main electronic control unit 22 intervenes in the valve actuation process of the valve-control unit 14 with regard for the intake valves as well as the exhaust valves. It has been demonstrated, however, that intervening in the exhaust valves alone allows a great deal of recuperation potential to be utilized that is negligibly less than when intervention is carried out on all valves, but the control expenditure that it requires is substantially less. The cost-benefit ratio is therefore more favorable when intervention is carried out on just the intake valves than when intervention is carried out on all valves.

Figure 4:
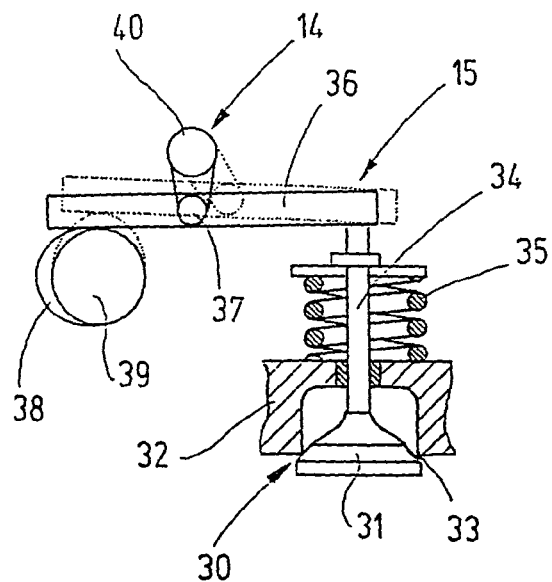

FIGS. 4 through 6 show three different exemplary embodiments of the valve-actuator drive 15 for an intake valve 30 with valve-control unit 14. The intake valve 30 has a valve head 31 that interacts with a valve seat 33 formed in the cylinder head 32 of the internal combustion engine 10, and a tappet or valve stem 34 driving the valve head 31 to perform the lifting motion. The valve stem 34 is loaded by a valve closing spring 35 so that the valve head 31 is pressed onto the valve seat 33, thereby holding the intake valve 30 closed. In the exemplary embodiment shown in FIG. 4, the valve stem 34 is actuated by a rocker arm 36 that is mounted approximately at its center on a swivel bearing 37. One lever end rests against the front end of the valve stem 34, and the other lever end rests against a control cam 38 under the pressure of the valve closing spring 35. Said control cam rotates in known fashion with a camshaft 39 driven via the crankshaft of the internal combustion engine 10. If the rocker arm 36 assumes the position illustrated in FIG. 4 with solid lines, the rocker arm 36 is raised and lowered continually by the control cam 38 when the camshaft 39 rotates, which causes the valve stem 34 in FIG. 4 to execute one stroke with each rotation of the control cam 38 to open and close the intake valve 30. The instants at which the intake valve 30 opens and closes can be varied by rotating the camshaft 39 relative to the crankshaft (changing the timing angle) or by rotating the control cams 38 on the camshaft 39. This is referred to as conventional valve actuation.

To obtain a target intervention in the valve actuation process, the swivel bearing 37 of the rocker arm 36 can be shifted. Said swivel bearing is situated on a pivoting control lever 40 of the valve-control unit 14 for this purpose. By pivoting the control lever 40, the swivel bearing 37 and, therefore, the rocker arm 36, are shifted so that its left lever arm—as shown in FIG. 4—rises increasingly further away from the control cam 38. In the position of the control lever 40, swivel bearing 37 and rocker arm 36 indicated in FIG. 4 with dotted lines, the distance between the left lever arm and the control cam 38 is such that said control cam is unable to displace the rocker arm 36 any further. In this position, the intake valve 30 remains closed while the control cam 38 rotates. The valve actuation has reached its lower limit, "valve completely closed". The duration of opening of the intake valve 30 and the lift of the valve stem 34 and/or the valve head 31 can be adjusted continuously between these two extreme positions of the swivel bearing 37 and the rocker arm 36. As the swivel bearing 37 is increasingly shifted out of its position indicated in FIG. 4 with solid lines, the duration of opening of the intake valve 30 becomes increasingly shorter until the intake valve 30 remains closed with the swivel bearing 37 in the position shown in FIG. 4 with dotted lines. It is also possible, of course, to use a hydraulic cylinder to move the swivel bearing 37, which will be described hereinbelow with reference to FIG. 5. In valve-actuator drives with "hydraulic tappets" that automatically adjust valve clearance, hydraulic cylinders of this nature can then be integrated in the hydraulic tappets, or the hydraulic tappets can be modified to vary the valve lift.

In FIG. 5, the rocker arm 36 of the valve-actuator drive 15 is replaced with a cam follower 41, one lever end of which is fixed in position in pivoting fashion in the swivel bearing 37, while the valve stem 34 rests against its other lever end in non-positive fashion under the force of the valve closing spring 35 not shown here. The camshaft 39 with control cams 38 contacts the cam follower 41 nearly in the center on the side furthest from the valve stem 34. The swivel bearing 37 of the cam follower 41 is located on a control plunger 42 that is displaceable in a hydraulic cylinder 43 of the valve-control unit 14. If the cam follower 41 assumes its position illustrated in FIG. 5 with solid lines, the intake valve 30 is controlled in conventional fashion by the control cams 38 of the rotating camshaft 39. The closing and opening time of the intake valve 30 is determined by the shape of the control cam 38, and it can be influenced by rotating the camshaft 39. If the swivel bearing 37 is shifted downward into the position illustrated with dotted lines by the movement of the control plunger 42 in the hydraulic cylinder 43, the cam follower 41 can no longer be actuated by the control cam 38, and the intake valve 30 remains closed. The main electronic control unit 22 can control the hydraulic cylinder 43 so that the position of the swivel bearing 37 of the cam follower 41 can be adjusted continuously between these two end positions, thereby enabling a continuous adjustment of the duration of opening and/or the lift of the intake valve 30.

In the case of the control drive 15 in FIG. 6, the swivel bearing 37 of the cam follower 41 is located on a control lever 40 of the valve-control unit 14—as is the case with the rocker arm 36 in FIG. 4—that can be pivoted continuously between two end positions—indicated in FIG. 6 with solid lines and dotted lines—by means of appropriate control signals from the main electronic control unit 22, so that the cam follower 41 can be moved between the two end positions-illustrated with solid and dotted lines in FIG. 6—in the same manner as described hereinabove. In the pivot position illustrated with dotted lines, the control cam 38 is unable to act on the cam follower 41, and the intake valve 30 remains closed.

In an alternative exemplary embodiment of the method according to the invention, the recuperative energy of the internal combustion engine 10 on overrun or during braking operation is utilized during vehicle deceleration by intervening in the valve actuation for the purpose of specifically releasing compression from the internal combustion engine 10. The target decompression is brought about by controlling the duration of opening and/or the lift of the exhaust valves. Starting with conventional valve actuation, the duration of opening and/or the lift of the exhaust valves is increased to the point where it reaches the maximum duration of opening of opening permitted on overrun. As for the remainder, the same philosophy of valve actuation and regulation of the electrical machine 16 as described hereinabove can be applied.

Various exemplary embodiments of the intervention in the valve-actuator drive 15 of an exhaust valve 44 by the valve-control unit 14 are shown in FIGS. 7 through 10. The exhaust valve 44 has the same design as the intake valve 30 in FIGS. 4 through 6, so identical parts are labelled with the same reference numerals. In this case as well, the valve-actuator drive 15 is equipped with a cam follower 41 that acts on the valve stem 34 and is supported in pivoting fashion by the swivel bearing 37. The cam follower 41 rests against the control cam 38 of the camshaft 39 under the force of the valve closing spring 35.

In FIGS. 7 and 8, the target decompression of the exhaust valve 44 is achieved by means of an adjusting wedge 45 and 45' that is inserted between the valve stem 34 and the cam follower 41 (FIG. 7), or between the cam follower 41 and the control cam 38 (FIG. 8). The extent to which the adjusting wedge 45 is pushed forward determines the extent of decompression, since the exhaust valve 44 is no longer capable of closing completely and, when it is in its closed position, a more or less large annular gap remains between valve head 31 and valve seat 33.

Figure 9:
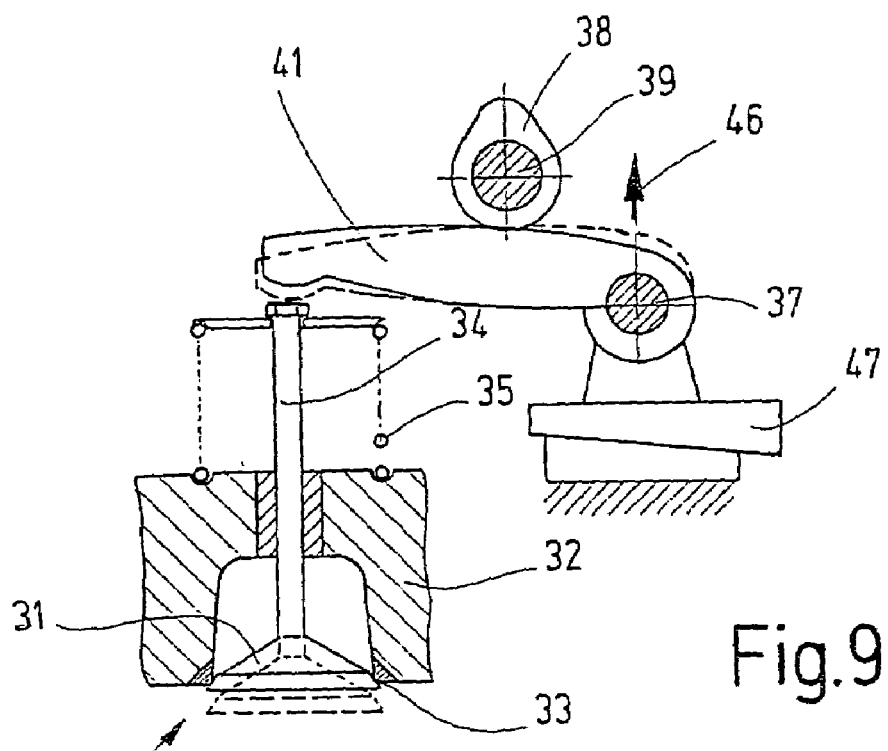

In the case of the exemplary embodiment of the exhaust valve 44 shown in FIG. 9, the target decompression is achieved by displacing the swivel bearing 37 of the cam follower 41, as indicated by the arrow 46. A displacement of this nature can be realized by means of an adjusting wedge 47 that brings about a vertical displacement of the swivel bearing 37, so that the cam follower 41 pivots into the position illustrated with a dashed line and, in a rotational position of the control cam 38 in which the exhaust valve 44 is normally closed, the valve head 31 therefore now remains lifted away from the valve seat 33. The exhaust valve 44 is open. The extent of the decompression can be adjusted by means of the size of the annular gap remaining between valve head 31 and valve seat 33.

Figure 10:
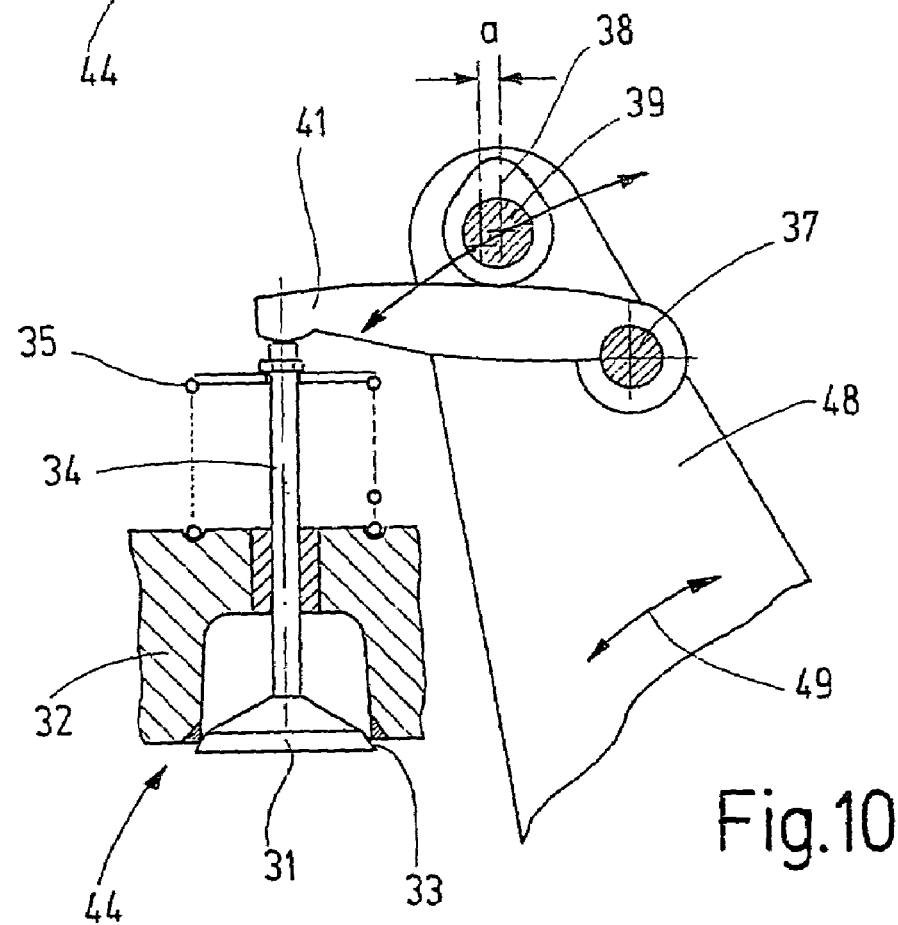

In the exemplary embodiment shown in FIG. 10, the camshaft 39 is displaced in order to obtain target decompression. In the exemplary embodiment, the camshaft 39 is turnably accommodated on a swiveling lever 48 that can be swivelled around a small pivoting angle in the direction of the double arrow 49. As a result, the camshaft 39 can be displaced by the amount "a" shown in FIG. 10. As a result of said displacement, when the control cam 38 is in the closed position, the cam follower 41 is preloaded downward with greater force and brings about an opening of the exhaust valve 44 via the valve stem 34. In this case as well, the size of the residual opening of the exhaust valve 44 that remains can be adjusted by the extent to which the swiveling lever 48 is pivoted. This, in turn, determines the level of decompression.

The invention is not limited to the exemplary embodiments described hereinabove. For example, instead of the mechanical valve-actuator drive 15, any other type of valve-actuator drive, e.g., an electronic or electro-hydraulic valve-actuator drive, can be used. The method according to the invention is used with particular advantage with an electromagnetic valve actuation system, because the target intervention in the valve actuation for obtaining recuperative operation is particularly simple in this case.

The valve-actuator drives 15 in their exemplary embodiments described with reference to FIGS. 4 through 8 can be used interchangeably in valve actuation with continuous closing of the intake and exhaust valves or the exhaust valves, an in valve actuation with target decompression of the internal combustion engine and the continual opening of the exhaust valves carried out for this purpose. To accomplish this, it is only necessary to invert the direction of displacement.

The adjusting wedges 45 can also be stops for the valve springs 35, or—unlike the arrangement shown in FIG. 8—they can rest between the camshaft 39 on the one hand and the cam follower 41, rocker arm or other components on the valve, e.g., overhead bucket-tappet assembly, on the other.

Furthermore, instead of the vehicle battery, another accumulator for electrical energy can be used, e.g., a capacitor.

What is claimed is:

1. A method for operating an internal combustion engine (10) installed in a motor vehicle having controlled intake and exhaust valves and that is coupled in fixed fashion with an electrical machine (16) charging an electrical energy accumulator, in particular a battery (21), wherein, in order to enable the electrical machine to perform recuperation on overrun or during braking operation of the internal combustion engine (10), the drag power or braking power of said internal combustion engine is regulated via intervention in the valve actuation process so that a braking or deceleration behavior of the motor vehicle is obtained that is familiar to the driver of the motor vehicle, wherein the valve actuation process and a regulation of the generator and motor operation of the electrical machine (16) are carried out as a function of the state of change, preferably of at least four levels of the state of charge, of the energy accumulator (21), wherein the valve actuation process and the regulation of the electrical machine (16) are coupled with a braking management system of the motor vehicle, and wherein the valve actuation process and the regulation of the generator or motor operation of the electrical machine (16) are carried out as a function of engine speed, accelerator-pedal travel and brake pressure.

2. The method according to claim 1, wherein the regulation of the braking power of the internal combustion engine is carried out as a function of the electrical braking power produced by the electrical machine (16) so that the sum of the braking power of the electrical machine (16) and the internal combustion engine (10) corresponds at any point during vehicle deceleration to the braking power produced by an internal combustion engine having conventional valve actuation.

3. The method according to claim 1, wherein the intervention in the valve actuation process is carried cut for the purpose of continually reducing the duration of opening and/or the lift of the valves up to the point of their closing.

4. The method according to claim 3, wherein the intervention in the valve actuation process is carried out exclusively on the intake valves (30).

5. The method according to claim 1, wherein the intervention in the valve actuation process takes place for the purpose of obtaining a target decompression of the internal combustion engine (10).

6. The method according to claim 5, wherein the target decompression of the internal combustion engine (10) is obtained by controlling the duration at opening and/or the lift of the exhaust valves (44).

7. The method according to claim 3, wherein the valves are closed on overrun when there is sufficient available charging capacity of the energy accumulator (21), and the alternator current produced by the electrical machine (16) is regulated so that the electrical machine (16) generates such a level of regenerative braking torque that a deceleration of the vehicle occurring on overrun with conventional valve actuation is simulated.

8. The method according to claim 3, wherein, on overrun when there is limited available charging capacity of the energy accumulator (21), the alternator current produced by the electrical machine (16) is regulated so that the electrical machine (16) generates such a level of regenerative braking torque that a portion of vehicle deceleration occurring an overrun with conventional valve actuation is simulated, and the remaining portion of vehicle deceleration is generated by the internal combustion engine (10) by means of an adapted intervention in the valve actuation process depending an the accelerator-pedal travel that occurs.

9. The method according to claim 8, wherein, as the alternator current decreases, the valves are controlled so that the braking torque produced by the internal combustion engine (10) increases accordingly, and, as the alternator current increases, the valves are controlled so that the braking torque produced by the internal combustion engine (10) decreases accordingly.

10. The method according to claim 7, wherein, for the valve actuation process and regulation of the electrical machine (16), at least one signed derived from a control system of a service brake of the motor vehicle or from a brake-light switch (27) is used.

11. The method according claim 7, wherein, for the valve actuation process and regulation of the electrical machine (16), at least one signal derived from a control system for A/F mixture and/or ignition of the internal combustion engine is used.

12. The method according to claim 10, wherein, for the valve actuation process and regulation of the electrical machine (16), at least one signal derived from a detection of the gear position of the vehicle transmission (12) is used.

13. The method according to claim 7, wherein, on overrun when brake pressure triggered by actuation of the brake pedal increases continually, the braking action of a service brake is not activated until the maximum braking torque of the electrical machine (16) working in the generator mode and the maximum braking torque of the internal combustion engine (10) are reached.

14. The method according to claim 7, wherein changeover processes in the valve actuation process and the regulation of the electrical machine (16) take place with hystereses that are dependent on the state of charge of the energy accumulator (21) or that are time-dependent.

15. The method according to one of the claim 7 wherein time constants in the driveability of an internal combustion engine (10) operated with conventional valve actuation are simulated in the valve actuation process and/or the regulation of the electrical machine (16).

16. The method according to claim 1, wherein, to intervene in the valve actuation process, the swivel bearings (37) of rocker arms or cam follower (36, 41) actuating valve stems (34) of the valves (30; 41), or the holder of a camshaft (39) on which a control cam (38) for actuating the rocker arm or cam follower (38; 41) is mounted are displaced, e.g., pivoted or shifted, using mechanical, pneumatic or hydraulic means.

17. The method according to claim 16, wherein, to achieve mechanical displacement, adjusting wedges (45, 45') are used that are inserted between the valve stems (34) and rocker arms or cam followers (41) or between rocker arms or cam followers (41) and control cams (38), or swiveling levers (40, 48') are used on which the swivel bearings (37) of the rocker arms or cam followers (36; 41) are located, or on which the camshaft (39) is supported.

18. A method for operating an internal combustion engine (10) installed in a motor vehicle having controlled intake and exhaust valves and that is coupled in fixed fashion with an electrical machine (16) charging an electrical energy accumulator, in particular a battery (21), wherein, in order to enable the electrical machine to perform recuperation on overrun or during braking operation of the internal combustion engine (10), the drag power or braking power of said internal combustion engine is regulated via intervention in the valve actuation process so that a braking or deceleration behavior of the motor vehicle is obtained that is familiar to the driver of the motor vehicle, wherein the valve actuation process and a regulation of the generator and motor operation of the electrical machine (16) are carried out as a function of the state of change, preferably of at least four levels at the state of charge of the energy accumulator (21), wherein the valve actuation process and the regulation of the electrical machine (16) are coupled with a braking management system of the motor vehicle, and wherein changeover processes in the valve actuation process and regulation of the electrical machine (16) take place with hystereses that are dependent an the state of charge of the energy accumulator (21) or that are time-dependent.

* * * * *